Dec. 5, 1950 W. IEU-LIANG WU 2,532,589

SIGNAL-SEEKING TRANSCEIVER

Filed July 9, 1945

INVENTOR.
WILLIAM IEU-LIANG WU
BY
William D. Hall
ATTORNEY

Patented Dec. 5, 1950 2,532,589

UNITED STATES PATENT OFFICE 2,532,589

SIGNAL-SEEKING TRANSCEIVER

William Ieu-liang Wu, New York, N. Y., assignor to the United States of America as represented by the Secretary of War Application July 9, 1945, Serial No. 604,066

5 Claims. (Cl. 250—15)

This invention relates to communication systems and more particularly to such systems designed to transmit a predetermined signal upon reception of a signal.

An object of this invention is to provide an improved transceiver adapted for the above purpose.

In accordance with the present invention, a receiver and transmitter are provided which are concurrently tuned and which preferably include a single resonant circuit in common. The tuning or resonant frequency is caused to sweep across the predetermined frequency range by rotation of a tuning capacitor. Upon detection of a received signal, the drive is caused to reverse and the transmitter is rendered effective. After a time interval, the drive is again reversed and the transmitter is rendered ineffective. During the second reversal which constitutes a forward searching sweep, if the received signal is again encountered, it will cause a third reversal and subsequent transmission. The process is continued indefinitely until the received signal is no longer detected, in which event the forward sweep of the tuning system is allowed to continue in a search for an additional received signal. The apparatus involved is wholly automatic and is designed to operate without attention.

For a better understanding of the invention, reference is made to the following detailed description and to the drawings, in which.

Figure 1:
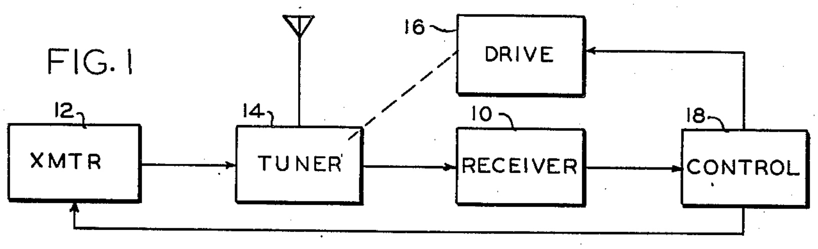
Fig. 1 is a block diagram illustrating the invention.

In Fig. 1, receiver 10 and transmitter 12 share a common tuning means 14 between them. The tuner 14 may be a fixed inductance and a variable capacitor (not shown) which is cyclically tuned by a reversible drive 16. The transmitter 12 is normally inactive, but is rendered operative when a signal from receiver 10 operates appropriate switches in control means 18 which also concurrently reverses the drive means 16. After a predetermined time interval, control means 18 is restored to its initial condition whereupon the drive 16 resumes its forward operation and cuts off the transmitter 12. Assuming the received signal to be present during this renewed forward drive, it will again be detected by the receiver 10. The system will sweep back and forth across that received signal, transmitting in response to it during alternate sweeps.

This system is capable of numerous refinements and of various useful modifications. For example, it may be desirable to allot a broad frequency band to a single apparatus, in which event it would be advantageous to cause a rapid forward sweep during the search but to diminish the speed of the reverse sweep during transmission. This may be effected through control of an electric motor in the drive means 16 or through the use of a speed control in the drive train, effective during the reverse sweeps. A similar effect can be obtained by using a large tuning capacitor in association with a band spread or vernier capacitor. In that event, the main capacitor could be driven in a forward direction through the vernier capacitor so that the reverse sweep, although it extends over a wide mechanical angle, would cause the transmitter frequency to sweep through only a narrow range. In the next forward sweep, the vernier capacitor would be driven by itself, and would sweep back and forth until the received signal disappeared. Then, in a forward sweep, it would pick up the main tuning capacitor and resume the search.

The control means may also take various forms. It may function upon the firing of a thyratron to initiate the reverse sweep, the duration of which depends upon the rate of discharge of a capacitor that was charged prior to firing of the thyratron. The discharge rate may be adjusted by a current-limiting resistor. The duration of reverse sweep may also depend upon the reverse sweep of the tuning mechanism itself as a mechanical delay-timer, and may take a wide variety of other forms.

The frequency of the transmitter, if it is a simple power oscillator, will ordinarily not be exactly the same as the receiver at the instant the control means is energized for a reversal. This is because the tube or tubes in the power oscillator have different input capacity when they are operating and when they are idle. The discrepancy is only slight and the simple system which results from the use of separate tubes for a sensitive receiver and a high-powered transmitter may warrant accepting this slight disadvantage.

Other arrangements are possible to eliminate the discrepancy. Through the use of a superheterodyne receiver having a pretuned radio-frequency stage in common with the transmitter, it is possible to track both units through adjustment of the oscillator in the receiver. This is because the pretuner in the superheterodyne is generally broad. Separate, tracked resonant circuits may similarly be used for transmitter and receiver. Another arrangement to assure tracking is the use of a common tube in both receiver and transmitter, such as is found in conventional super-regenerative transceiver systems.

Figure 2:
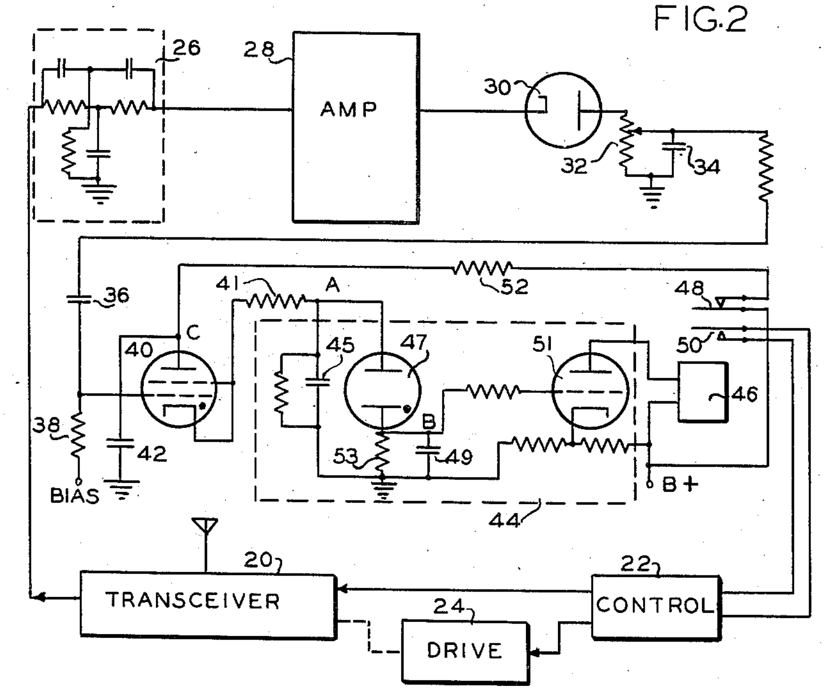
Fig. 2 is another schematic representation of a preferred form of the invention showing part of the wiring diagram in detail.

In Fig. 2 is shown such a super-regenerative transceiver 20 with its conventional "receive-transmit" control switches 22 to which are added appropriate control contacts for reversing the tuner drive 24, in conjunction with an associated control circuit.

Characteristically a super-regenerative receiver has a very high noise level accompanying the squelch-frequency in its output while no signal is being received. In the circuit shown, the squelch-frequency is blocked by a filter, such as the parallel-T resistance-capacity network indicated by the dashed rectangle 26. The remaining noise output from the receiver is then amplified in that portion of the circuit indicated by rectangle 28. The amplifier 28 is designed to be responsive to noise frequencies (15 to 20 kilocycles) and not to other signals, so as to suppress commonly used modulation frequencies in the received signal. The output is rectified by a suitable rectifier such as diode 30, producing a direct-current voltage drop across the filter comprising resistor 32 and capacitor 34. The output of this noise amplifier and rectifier combination produces a constant voltage drop across capacitor 36 during normal operating conditions. However, when the receiver approaches a signal, the noise disappears and with it the negative potential at the input side of capacitor 36. This reduction of negative potential operates the same as a positive input pulse across resistor 38 to fire thyratron 40. The thyratron 40 continues conducting so long as capacitor 42 between its anode and ground remains charged sufficiently. An electronic timer 44 in the cathode circuit of thyratron 40 acts to delay briefly the energization of a relay 46, and then to keep that relay energized for a predetermined time interval, for a reason which will be explained presently.

Figure 3:
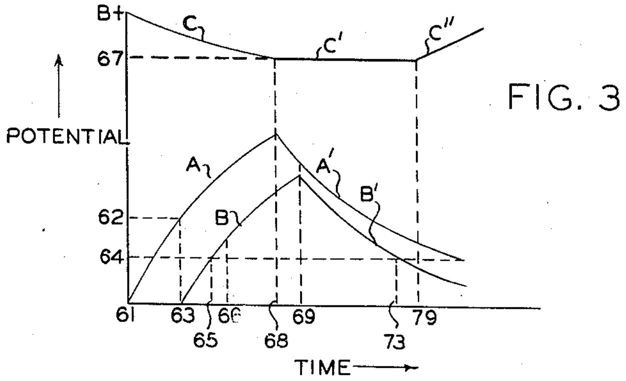
Fig. 3 is a graphical representation of some waveforms involved in the operation of the circuit of Fig. 2.

The actual operation of the timer 44 in effecting the above-mentioned delay, and the operation of the relay 46, are best illustrated and explained with reference to Fig. 3 of the drawings. In Fig. 3 there are shown the approximate waveforms of the voltage at points A, B and C (Fig. 2) as functions of time prior to, during and just after transmission. When the pulse from tube 30, due to a received signal, causes the tube 40 to conduct, at a time 61 in Fig. 3, the voltage at point A starts to rise as indicated by the curve marked A in Fig. 3. At the same time the voltage at point C starts to decay as shown by the curve marked C in Fig. 3. When the voltage at A reaches a critical value 62, at a time 63, the neon tube 47 begins to conduct. At this time, 63, the capacitor 49 starts charging and the voltage at point B rises according to some curve such as curve B in Fig. 3. When the voltage at B reaches a value such as 64, at a time 65, the triode 51 commences conducting. After a time interval 65—66 the relay 46 will have become actuated and contact 50 will close, causing a reversal of the tuner drive and causing the transmitter portion of the transceiver 20 to become operative. At the time 66, the relay contact 48 opens and plate supply voltage is removed from the capacitor 42 and resistor 52. The time delay represented by interval 65—66 is due primarily to the inertia of the relay 46. When the capacitor 42 has discharged through tube 40 and capacitor 45 to a critical value such as 67 (Fig. 3), at a time 68, the voltage across the tube 40 will be insufficient to maintain the tube 40 in a conducting state. Therefore, at time 68, the capacitor 45 begins to discharge along the curve A'. At a time 69, the voltage at point A (curve A') is no longer sufficient to maintain the tube 47 in a conducting state, and the capacitor 49 begins to discharge along a curve such as B'. At a time 73, the voltage at point B (curve B') drops below the conduction voltage 64 of tube 51 and the relay 46 is deenergized. Some time, represented in Fig. 3 by the interval 73—79, will be required for the closing of contact 48 and the opening of contact 50. From Fig. 3 it will thus be seen that the delay period 61—66 was effected after the reception of the signal before transmission began and that transmission will occur during the time interval 66—79. It will further be noted by reference to Fig. 3 and from a consideration of the circuit of Fig. 2 that the charge of capacitor 42 will be substantially constant (C') during the period 68—79, after which time capacitor 42 will be recharged along curve C'' by the plate voltage supply through relay contact 48 and resistor 52. The capacitors 45 and 49 will continue to discharge exponentially along curves A' and B'.

By proper proportioning and adjustment of the components of the delay circuit just described, it is possible to have the transceiver start operating as a transmitter just as the system reaches the far side of the acceptance band of the receiver associated with the transmitter originating the received signal (relying in part on momentum of the tuner) and continue transmission only until the first-encountered side of the acceptance band of the receiver associated with the transmitter originating the received signal is reached. This end is desired for best efficiency since transmitted power and transmitting time are wasted if they are not within the acceptance band of the receiver to which the transmission is directed. The sweep speed and the frequency of reversals may be varied as desired.

What is claimed is:

1. Automatic apparatus for transmitting in a radio channel within a predetermined frequency range upon reception of a signal in that channel, comprising a receiving portion, a normally inactive transmitting portion, said transmitting and receiving portions being adapted to be tuned concurrently over a predetermined frequency range, a reversible drive for tuning said transmitting and receiving portions, said drive being normally operative in a given direction, means initially controlled by said receiving portion to reverse said drive as the tuning passes a received signal and to restore the original direction of drive after a predetermined time interval which is long enough to permit the tuning to pass said signal again, and means for rendering the transmitting portion of the system effective during said interval, whereby the drive means will cause the tuning to sweep repeatedly across the received signal frequency, the apparatus alternately searching for the signal and transmitting in response to it.

2. Radio apparatus for transmitting in a frequency channel forming a portion of a predetermined frequency range upon reception of a signal in that channel, comprising a receiving portion having a high noise output when no signal is received and a low noise output when a signal is received, first means connected to the output of said receiving portion for producing a voltage which is proportional to the magnitude of said noise output, a normally inactive transmitting portion, means for tuning said transmitting and receiving portions concurrently over a predetermined frequency range, a reversible drive for said tuning means, said drive being normally operative in a given direction, control means effective when operated to reverse said drive and render said transmitting portion operative, second means connected to said first means, said second means maintained normally nonconducting by the voltage produced by said first means, said second means becoming conductive when a signal is received, third means responsive to the output of said second means and effective when actuated to operate said control means and also to render said second means unresponsive to said voltage, thereby causing said control means to be unaffected by the reception of the signal being transmitted by the transmitting portion, a timer interposed between said second and third means to delay actuation of said third means and thereby enable said tuning means to traverse said channel before said drive is reversed and said transmitting portion is rendered effective and also to restore said third means after said tuning means has traversed said channel in the opposite direction, whereby the apparatus is enabled to alternately search for a signal and transmit in response to it.

3. Radio apparatus for transmitting in response to a received signal including a receiver, a transmitter, means for concurrently tuning said receiver and transmitter in a given direction, means for reversing the direction of said tuning in response to a received signal whereby said transmitter and receiver are concurrently tuned in the opposite direction, means for restoring said tuning to said given direction after a predetermined interval and means for activating said transmitter only during said interval, whereby the apparatus is enabled to alternately search for a signal and transmit in response to it.

4. Radio apparatus for transmitting in a frequency channel forming a portion of a predetermined frequency range upon the reception of a signal in said channel, including a normally inactive transmitter, a receiver, means for concurrently sweeping the tuning of said transmitter and receiver back and forth over said range, means responsive to a received signal for limiting said sweeping to the channel of said received signal and means for activating said transmitter only when said received signal channel is being swept in one direction and deactivating said transmitter when said received signal channel is being swept in the opposite direction, whereby said apparatus alternately searches for a signal and transmits in response to it.

5. Radio apparatus for transmitting in response to a received signal, including a receiver, a transmitter, means for tuning said receiver in a given direction, means for reversing the direction of said tuning in response to a received signal, means for restoring said tuning to said given direction after a predetermined interval, means for activating said transmitter only during said interval, and means for tuning said transmitter through the frequency range traversed by said receiver tuning during said interval, whereby the apparatus is enabled to alternately search for a signal and transmit in response to it.

WILLIAM IEU-LIANG WU.

REFERENCES CITED

The following references are of record in the file of this patent:

UNITED STATES PATENTS

| Number | Name | Date |
|---|---|---|
| 2,209,273 | Hills | July 23, 1940 |
| 2,363,583 | Gilman | Nov. 28, 1944 |
| 2,378,604 | Wallace | June 19, 1945 |

FOREIGN PATENTS

| Number | Country | Date |
|---|---|---|
| 811,767 | France | Jan. 23, 1937 |